United States Patent [19]

Stauffer

[11] 3,989,809
[45] Nov. 2, 1976

[54] PROCESS FOR THE RECOVERY OF SULFUR

[75] Inventor: Adolf Stauffer, Pulheim, Germany

[73] Assignee: Davy Powergas GmbH, Germany

[22] Filed: June 28, 1974

[21] Appl. No.: 484,265

[30] Foreign Application Priority Data
June 28, 1973 Germany............................ 2332886

[52] U.S. Cl............................ 423/567 A; 423/356; 423/541 R
[51] Int. Cl.²......................................... C01B 17/00
[58] Field of Search................ 423/567, 541, 541 A, 423/566, 563, 351, 237, 248, 220, 356, 569

[56] References Cited
UNITED STATES PATENTS

| | | | |
|---|---|---|---|
| 3,359,069 | 12/1967 | Furkert | 423/541 A |
| 3,795,731 | 5/1974 | Furkert | 423/541 A |
| 3,839,549 | 10/1974 | Deschamps | 423/356 |

FOREIGN PATENTS OR APPLICATIONS

| | | | |
|---|---|---|---|
| 596,613 | 4/1960 | Canada | 423/569 |
| 876,442 | 8/1961 | United Kingdom | 423/356 |

*Primary Examiner*—L. Dewayne Rutledge
*Assistant Examiner*—Michael L. Lewis
*Attorney, Agent, or Firm*—Morton, Bernard, Brown, Roberts & Sutherland

[57] ABSTRACT

Elemental sulfur is recovered from ammonium salts of sulfuric oxyacids (e.g. ammonium sulfate, ammonium hydrogen sulfite, and ammonium sulfite) by passing the salt (e.g. in aqueous solution) and a hydrogenous reducing agent (e.g. sewer gas or coal gas) through a reaction chamber maintained at 800° to 1300° C. so as to yield a product gas containing molecular nitrogen, steam, and vaporous sulfur, and then cooling the product gas to 125° to 325° C. so as to condense at least a portion of the sulfur, which is then recovered.

15 Claims, 1 Drawing Figure

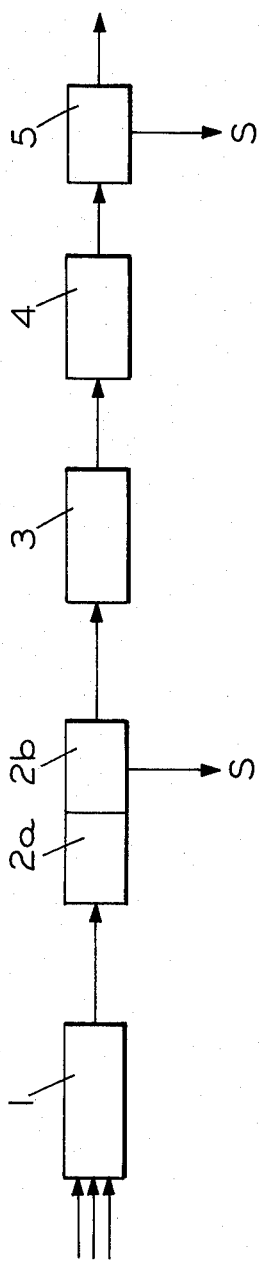

PROCESS FOR THE RECOVERY OF SULFUR

The invention relates to a method for recovery of sulfur from ammonium salts of sulfuric oxyacids, which salts may also be present in aqueous solution or suspension, and in admixture with the corresponding free acids.

Proposals are known to dissociate ammonium sulfate or ammonium hydrogen sulfate in solid or dissolved form at high temperatures whereby the ammonium moiety of the salt is oxidized to yield molecular nitrogen, and sulfur dioxide is formed from the sulfate moiety of the salt. The sulfur dioxide-containing gas obtained in that method is further processed to sulfuric acid, which in certain cases can be reused in the process from whence the ammonium salt originated in the first place (e.g. in caprolactam production). Frequently, however, there is no need for sulfuric acid, so that it would be advantageous to process the ammonium salts of sulfuric oxyacids, especially when they are obtained as waste products, for instance as spent wash solutions produced in the ammoniacal washing of sulfur oxide-containing waste gases, to elemental sulfur, which can be more easily stored and shipped than sulfuric acid.

The task of the present invention consists, therefore, in the finding of a method for the recover of elemental sulfur from ammonium salts of sulfuric oxyacids (particularly sulfuric acid and sulfurous acid), which salts may, if desired, be present in aqueous solution or suspension, and in admixture with the corresponding free acids. Most particularly, wash solutions or suspensions that are produced in the aqueous ammonia washing of $SO_2$ and $SO_3$ containing waste gases (e.g. flue gases) are to be processed to elementary sulfur and removed in this manner.

According to the present invention, the above-mentioned problem is solved by introducing the ammonium salt or salts, together with a hydrogenous reducing agent (either molecular hydrogen or a hydrogen-containing compound) into a reaction chamber which is kept at temperatures between 800° and 1,300° C., then cooling the product gas discharged from the reaction chamber to 125° to 325° C., and simultaneously separating, by condensation, a substantial portion of the elemental sulfur formed. In the reaction chamber the ammonium salts of the sulfuric oxyacids, and free sulfuric oxyacids (and acid salts), if such are present, are dissociated while being reduced, and at the same time any water that is introduced with the ammonium salts is vaporized. In addition to nitrogen and steam, sulfur, hydrogen sulfide, and possibly sulfur dioxide are produced in the reduction. After the reduction, 50 to 90% of the sulfur contained in the original raw material is present in elementary form. The product gas is cooled, advantageously in steps, in which process in the last cooling stage sulfur, too, is separated by condensation. Depending on the temperature of the product gas, 50 to 95% of the sulfur formed is obtained in liquid form.

In the preferred embodiment of the present invention, a molecular hydrogen-containing gas mixture, e.g., coal gas or sewer gas, is employed as the reducing agent. Hydrogen-containing compounds, especially hydrogen sulfide, ammonia and/or one or more hydrocarbons, may also be used, however, as reducing agents. Among the hydrocarbons, low molecular weight hydrocarbons, e.g. lower alkanes such as methane, ethane, and propane, are preferred. The amount of reducing agent supplied to the reaction chamber is preferably 1 to 3 times, most especially 1.2 to 2 times, the amount that is stoichiometrically required to reduce all of the sulfur content of the ammonium salt or salts to elemental sulfur. In this regard it must be taken into account that at least a part of the reducing agent is generated in the reaction chamber by the dissociation of the ammonium moiety of the ammonium salt or salts employed.

In the preferred embodiment of the present invention, the reaction temperature is kept between 1050° and 1200° C. An advantageous method of maintaining the reaction temperature is by combusting a fuel within the reaction chamber with approximately a stoichiometric amount of oxygen. A part of the reducing agent can serve as fuel, so that no undesirable constituents from the combustion products enter the product gas. According to another embodiment, however, the reaction chamber may be heated indirectly and be kept under a partial vacuum, i.e. at subatmospheric pressure. Indirect heating presents the advantage that the product gas is not diluted, or is only unsubstantially diluted, by combustion products, and, therefore, a greater amount of elemental sulfur is produced. By maintaining the reaction chamber at subatmospheric pressures one assures that no gas can escape from the reaction chamber.

In the preferred embodiment of the present invention, the further provision is made that the product gas be cooled, for the purpose of sulfur condensation, to 130° to 250° C. or 125° to 200° C. As mentioned above, the cooling advantageously takes place stepwise, for instance first in a waste heat boiler with production of steam, and then in a condensation stage by means of indirect heat exchange with boiler feed water.

It is also advantageous to subject the uncondensed product gas, after the elemental sulfur is separated therefrom by condensation, to further reaction in a Claus furnace. The uncondensed product gas will usually contain considerable amounts of $H_2S$, $SO_2$, and non-condensed sulfur. In the Claus furnace the uncondensed product gas is heated, possibly after the addition of molecular oxygen, at 150° to 350° C., preferably at 200° to 300° C., and then passed over a catalyst, e.g., aluminum oxide, so as to form more elementary sulfur. After renewed cooling, for instance in a waste heat boiler, to, for example, 115° to 180° C., the elemental sulfur formed in the Claus furnace is separated by condensation. If necessary, the residual gas can once more be reacted in a Claus furnace and then cooled to separate sulfur, and/or it can be subjected to afterburning. If the process of the present invention is connected to the outlet of a flue gas desulfurization unit, the said residual gas may also be burned below the boiler or be added to the flue gas upstream of the desulfurization unit, since its volume, in comparison with that of the flue gas, is very small.

The process of the present invention is described in the following discussion in greater detail by reference to the attached drawing, which shows the flow diagram of a suggested plant for carrying out the process.

Referring now to the drawing, the ammonium salts of the sulfuric oxyacids, the reducing agent, and a measured quantity of oxygen (measured in such a way that by the combustion of a part of the reducing agent a temperature of about 1100° C. is maintained in the furnace) are introduced into a reduction furnace 1. The product gas, which consists essentially of steam, vaporous sulfur, $H_2S$, $SO_2$, $N_2$, and possibly $CO_2$, and has a temperature of about 1100° C., is cooled, first to about 400° C. in a waste heat boiler 2a, while steam is produced, and subsequently to 140° C. in a feed water preheater 2b, while vaporous sulfur is condensed to a liquid. The uncondensed product gas is then heated in a heat exchanger 3 to the temperature necessary for the Claus process, e.g., 250° C., and is then reacted in a Claus furnace 4 to form additional elementary sulfur. Subsequently, the product gas from the Claus furnace 4 is again cooled in waste heat boiler 5, e.g., to 130° C., so as to condense and separate the newly formed elemental sulfur to a large extent.

EXAMPLE 7,200 kg/h of spent wash solution from the scrubbing of flue gas with an aqueous ammoniacal solution, the spent wash solution consisting of 25.5% by weight of ammonium sulfate, 20.4% b.w. of ammonium hydrogen sulfite, 14.1% b.w. of ammonium sulfite, and 40.0% b.w. water, together with 2,400 $Nm^3$/h (standard cubic meter per hour) of sewer gas, were fed to a reduction furnace. For maintaining the reaction temperature of 1168° C., the sewer gas was burned with 2300 $Nm^3$/h of 98% industrial oxygen. The sewer gas had the following composition:

| Hydrogen | 54% by volume |
| --- | --- |
| Methane | 21% by volume |
| Heavy Hydrocarbons | 3% by volume |
| Carbon Monoxide | 14% by volume |
| Carbon Dioxide | 4% by volume |
| Nitrogen | 4% by volume |

The product gas leaving the furnace flowed through a waste heat boiler wherein it was cooled to about 400° C. In this process 6,500 kg/h steam with a pressure of 30 atmospheres (of atmospheric excess pressure) was produced. In addition to steam the product gas had the following composition:

| Carbon Dioxide | 10.1% by volume |
| --- | --- |
| Nitrogen | 7.4% by volume |
| Vaporous sulfur | 2.8% by volume |
| Hydrogen Sulfide | 0.48% by volume |
| Sulfur Dioxide | 0.23% by volume |

The product gas was subsequently cooled in a second section of the waste heat boiler, by means of boiler feed water, to 160° C. In this process 950 kg/h sulfur condensed and was directly collected in the waste heat boiler and in a sulfur separator connected to the outlet of the boiler.

The uncondensed product gas was then heated in a heat exchanger to 245° C. and then further reacted in a Claus furnace. The Claus furnace product gas was then cooled in a waste heat boiler to 125° C., as a result of which another 226 kg/h sulfur was condensed and collected. The remaining residual gas, which still contained 0.1% by volume $H_2S$, 0.05% by volume $SO_2$, and 0.01% by volume vaporous sulfur, was passed through a vapor separator, which separated fine sulfur droplets, and then afterburned with a natural gas flame. The combustion product from the afterburning was returned to the flue gas scrubber. The total amount of liquid sulfur recovered in the two stages was 1176 kg/h, which is a yield of 98%, based on the entire sulfur content of the spent wash solution employed.

I claim:

1. A method for recovering elemental sulfur from an ammonium salt of a sulfuric oxyacid, comprising reacting said salt and a hydrogenous reducing agent in a reaction chamber which is maintained at reducing conditions including a temperature between 800° and 1300° C. so as to yield a product gas consisting essentially of molecular nitrogen, steam and vaporous sulfur in an amount which is 50 to 90% of the sulfur contained in said ammonium salt, discharging said product gas from the reaction chamber, cooling the product gas to a temperature of 125° to 325° C. so as to condense at least 50% of the sulfur to molten elemental sulfur, and separating said molten elemental sulfur from the uncondensed gas.

2. The method of claim 1, characterized in that molecular hydrogen-containing gas is employed as the reducing agent.

3. The method of claim 1, characterized in that the reducing agent is selected from the group consisting of hydrogen sulfide, ammonia, and hydrocarbons.

4. The method of claim 1, characterized in that the reaction chamber temperature is maintained between 1050° and 1200° C.

5. The method of claim 1, characterized in that a fuel is combusted with an approximately stoichiometric amount of molecular oxygen for combustion of the fuel in the reaction chamber in the presence of the mixture of the salt and the reducing agent.

6. The method of claim 1, characterized in that the reaction chamber is heated indirectly and maintained at subatmospheric pressure.

7. The method of claim 1, characterized in that the product gas is cooled, for the purpose of sulfur condensation, to 125° to 200° C.

8. The method of claim 1, characterized in that the uncondensed gas, after the molten elemental sulfur is separated therefrom, contains $H_2S$ and $SO_2$ and is conducted to a Claus furnace wherein the $H_2S$ and $SO_2$ are reacted to yield additional elemental sulfur.

9. The method of claim 1, characterized in that coal gas or sewer gas is employed as the reducing agent.

10. The method of claim 2, characterized in that the ammonium salt comprises ammonium sulfate.

11. The method of claim 10, characterized in that the ammonium salt is introduced to said reaction chamber in the form of solution or suspension in water.

12. The method of claim 11, characterized in that the amount of reducing agent in the reaction chamber is 1 to 3 times the amount stoichiometrically required to reduce all of the sulfur content of the ammonium salt to elemental sulfur.

13. A method for recovering elemental sulfur from a spent aqueous ammoniacal wash solution that has been used to scrub a $SO_2$-containing waste gas, wherein said spent solution contains ammonium sulfate, ammonium hydrogen sulfite, and ammonium sulfite, comprising reacting said spent solution and molecular hydrogen in a reaction chamber which is maintained at a temperature between 1050° and 1200° C. by combusting a carbonaceous fuel therein with an approximately stoichiometric amount of oxygen for combustion of the fuel, so as to yield a product gas consisting essentially of molecular nitrogen, steam, vaporous sulfur, in an amount which is 50 to 90% of the sulfur contained in said spent solution, $H_2S$, $CO_2$ and $SO_2$, the amount of molecular hydrogen used being sufficient to provide reducing agent in the chamber in an amount 1.2 to 2 times that stoichiometrically required to reduce all of the sulfur content of the spent solution to elemental sulfur; discharging said product gas from the reaction chamber; cooling the product gas to 125° to 200° C. so as to condense 50 to 95% of the sulfur to molten elemental sulfur; separating said molten elemental sulfur from the uncondensed gas; and conducting the uncondensed gas to a Claus furnace wherein the $H_2S$ and $SO_2$ are reacted to yield additional elemental sulfur.

14. The method of claim 13, characterized in that the molecular hydrogen and carbonaceous fuel are supplied to the reaction chamber as coal gas or sewer gas.

15. A method for recovering elemental sulfur from an ammonium salt of a sulfuric oxyacid comprising ammonium sulfate which comprises reacting said salt and a hydrogenous reducing agent in a reduction chamber which is maintained at reducing conditions and at a temperature between 800° and 1300° C. to dissociate and reduce said salt to provide a product consisting essentially of molecular nitrogen, steam, and vaporous sulfur in an amount which is 50 to 90% of the sulfur contained in said salt; discharging said product gas from the reduction chamber; and separating elemental sulfur from the product gas by condensation of vaporous sulfur to molten sulfur.

* * * * *